(No Model.)
T. B. TUCKER.
FORMER FOR PLASTER MOLDING.
No. 251,974. Patented Jan. 3, 1882.
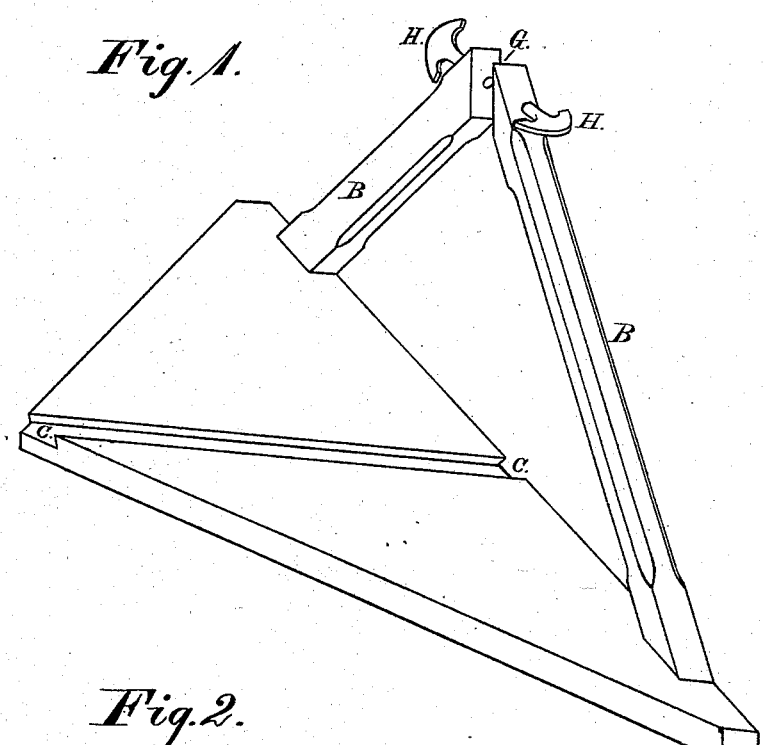
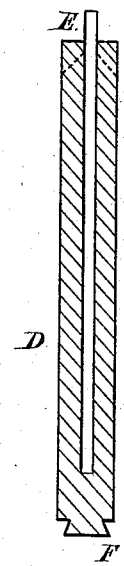
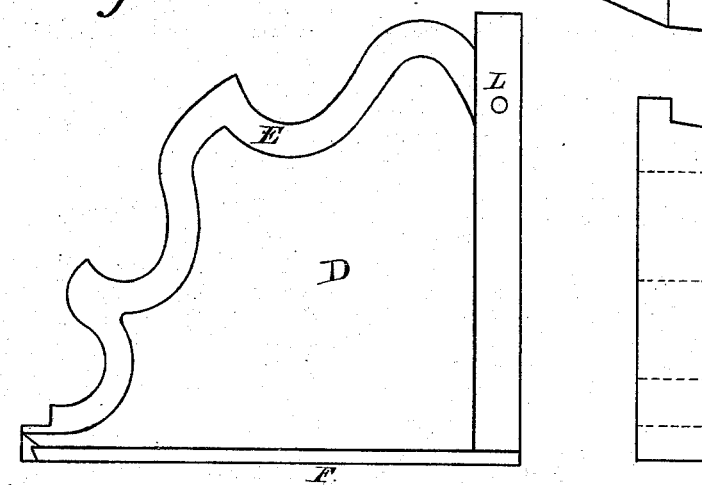
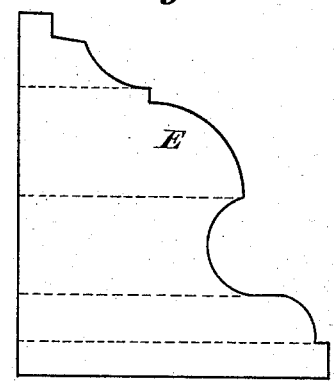
Witnesses.
Aldison H. Study
P. M. Hosington
Inventor.
Thomas B. Tucker
By F. B. Hunt
Atty

UNITED STATES PATENT OFFICE.

THOMAS B. TUCKER, OF STAR, INDIANA.

FORMER FOR PLASTER-MOLDING.

SPECIFICATION forming part of Letters Patent No. 251,974, dated January 3, 1882.

Application filed June 29, 1881. (No model.)

*To all whom it may concern:*

Be it known that I, THOMAS B. TUCKER, of Star, Rush county, Indiana, have invented certain Improvements in Formers for Plaster-Molding, of which the following is a specification.

My invention relates to formers for plaster-molding; and it consists, first, in making the mold or former detachable from the base or frame, so that any kind of mold or pattern may be used with the same base; secondly, in providing a support for both sides of the mold; thirdly, so constructing the former or mold that it can be taken off at any point without cutting the mold, as hereinafter fully described.

Figure 1 is a perspective of the frame and base which supports the mold or former. Fig. 2 is a plan view of a mold or former. Fig. 3 is a vertical cross-section through the mold or former and its support. Fig. 4 is a plan of a mold or former constructed to allow it to be taken off of the work without cutting the same.

A is the base, and B B the handles attached thereto. C is a groove cut in the base A to receive the dovetail F at the lower side of the support D. The upper back part of the support D receives the thumb-screws H at L to hold the support perpendicular and support the upper ends of the handles B.

The former or mold E, Figs. 2 and 3, is supported on both sides by the backing or support D, as seen in the section, Fig. 3.

In the ordinary construction the mold or former is simply attached to one side of a support, hence can be run but one way, whereas my construction may be run both ways with impunity, and equally supported either way.

The mold or former E may be cast as an integral part of the support D, or may be made separate, as shown in the section, Fig. 3, and held in place by means of screws passing through it and the support, thus making it detachable from the support and the whole detachable from the base A.

Fig. 4 represents the former E detached and formed so as to be taken off from the work at any point without cutting the same. It is obvious that great variety of mold may be constructed on this plan.

The former E, Fig. 4, is constructed so that it may be taken off the work at any point, as is clearly shown by the horizontal dotted lines, no curve or angle reaching above or below the dotted line so as to interfere with the mold being taken directly off of the work in a straight line horizontally. Thus it will be seen that any mold constructed on this plan can be taken off of the work at any point without cutting the same.

The support D reaches up near the edge of the mold or former E to hold it stiff and firmly to the work. This support may be cast with a recess for the former E and the dovetail F for attaching to the base, as seen in Fig. 3.

Having thus fully described my invention, what I claim, and desire to secure by Letters Patent, is—

1. In combination with the mold or former E, the support D, extending to near the outer edge of said former and supporting it on both sides, substantially as set forth.

2. The support D, cast with a central recess for the former E, and provided with the dovetail F, for the purpose of attaching the whole to the base A, substantially as set forth.

THOMAS B. TUCKER.

Witnesses:
O. R. DEEDS,
WM. S. REID.